(12) United States Patent
Das

(10) Patent No.: US 8,391,829 B2
(45) Date of Patent: Mar. 5, 2013

(54) REMOTE VEHICLE DATA ACCESS DURING A MULTI-WAY CALL WITH A VEHICLE TELEMATICS UNIT

(75) Inventor: Swapan Das, Canton, MI (US)

(73) Assignee: General Motors LLC, Detroit, MI (US)

(*) Notice: Subject to any disclaimer, the term of this patent is extended or adjusted under 35 U.S.C. 154(b) by 347 days.

(21) Appl. No.: 12/813,184

(22) Filed: Jun. 10, 2010

(65) Prior Publication Data

US 2011/0306329 A1    Dec. 15, 2011

(51) Int. Cl.
*H04M 11/04* (2006.01)
(52) U.S. Cl. .......... 455/404.1; 455/404.2; 455/416; 455/414.1; 455/418; 455/569.2
(58) Field of Classification Search .......... 455/404.1, 455/404.2, 416, 417, 414.1, 418, 569.2, 569.1; 370/260; 379/45, 88.26, 196

See application file for complete search history.

(56) References Cited

U.S. PATENT DOCUMENTS

| 2007/0091830 | A1* | 4/2007 | Coulas et al. ............ 370/260 |
| 2008/0143497 | A1 | 6/2008 | Wasson et al. |
| 2009/0168974 | A1 | 7/2009 | McCormick |

\* cited by examiner

*Primary Examiner* — Kathy Wang-Hurst
(74) *Attorney, Agent, or Firm* — Anthony Luke Simon; Reising Ethington P.C.

(57) ABSTRACT

A system and method for obtaining data during a multi-way call involving at least a vehicle telematics unit, call center, and third party such as a public safety answering point (PSAP). While connected together in at least a three-way voice call, the connection from the telematics unit is switched out of the call and connected to a data modem to receive vehicle data uploaded from the telematics unit. This can be used to provide vehicle location and other vehicle information such as current vehicle conditions and operational state. Thereafter, the telematics unit connection is switched back into the multi-way call to permit continued voice communications between the parties. The uploaded vehicle data can then be used by the call center or PSAP to provide emergency or other assistance.

14 Claims, 3 Drawing Sheets

REMOTE VEHICLE DATA ACCESS DURING A MULTI-WAY CALL WITH A VEHICLE TELEMATICS UNIT

TECHNICAL FIELD

The present invention relates generally to providing telematics services to a vehicle and, more particularly, to techniques for using a vehicle telematics unit and call center to access and assist a public service answering point (PSAP) in supplying emergency services to persons at the vehicle.

BACKGROUND OF THE INVENTION

The use of telematics units in vehicles today permit a telematics service provider to supply a variety of services to users of the vehicle. These telematics units can be interfaced to other vehicle systems so that a variety of vehicle data can be accessed by the telematics unit and provided remotely to a call center via a cellular or other wireless communication system. Vehicle data can include such things as vehicle location obtained from a global positioning system (GPS) receiver or other means, vehicle operational data (odometer readings, speed, oil life, diagnostic information, etc.), vehicle identification (VIN, electronic module serial numbers, etc.) and other data, including crash sensor data that can automatically initiate an emergency call to the call center in the event that a vehicle impact is detected. Whether the result of an automatic emergency call or from a manual (e.g., voice or pushbutton) input, an emergency call to the call center can be handled by an advisor at the call center who is able to contact an emergency dispatcher at a PSAP.

Currently, in these emergency situations, one system known to the inventor provides enhanced features that include (1) the ability of the advisor at the call center to obtain various vehicle data, such as location and other information that can be used to help assess the vehicle situation and severity of the emergency, and (2) the ability to connect the call between the vehicle and call center with the call to the PSAP to provide a three-way call that permits voice communication between persons at the vehicle and PSAP. In some such instances, it can be desirable to obtain additional vehicle data during this three-way call, in which case the advisor switches the call within the call center to a data modem that communicates electronically with the telematics unit over the three-way call to obtain the desired data from the vehicle. During this time, the advisor is not able to communicate over the three-way call with persons at either the vehicle or PSAP. Furthermore, the dispatcher or other PSAP personnel is forced to wait for the data transmission to complete which involves using modem signalling that is audible to the PSAP personnel.

SUMMARY OF THE INVENTION

According to an aspect of the invention, there is provided a method of obtaining vehicle data during a multi-way call involving a vehicle telematics unit, call center, and at least one third party. The method includes the steps of: (a) conducting a multi-way voice call involving at least three different phone terminal units which include a vehicle telematics unit, call center terminal, and a third party terminal, wherein the multi-way call involves a telephone connection to the telematics unit and a telephone connection to the third party terminal; (b) switching the vehicle telematics unit from the multi-way voice call to a separate call between the telematics unit and a data receiver without ending the telephone connection to the telematics unit and while maintaining the multi-way voice call as at least a two-party call between the call center terminal and the third party terminal; (c) receiving, at the data receiver, vehicle data sent from the telematics unit over the separate call; and (d) ending the separate call with the data receiver and reconnecting the telematics unit to the multi-way voice call without ending the telephone connection to the telematics unit.

In accordance with another embodiment, there is provided another method of obtaining vehicle data during a multi-way call involving a vehicle telematics unit, call center, and at least one third party. The method includes the steps of: (a) receiving a telephone call at a call center placed from a cellular phone located at a vehicle having at least one occupant requiring emergency assistance; (b) conducting an initial voice conversation between an advisor at the call center and a person at the vehicle via the cellular phone; (c) establishing a three-way call by connecting a public safety answering point (PSAP) into the telephone call so as to place the person at the vehicle in voice communication with a person at the PSAP via the three-way call; (d) splitting the three-way call into a first two-way call between the cellular phone and call center and a second two-way call between the call center and PSAP; and (e) receiving vehicle data at the call center that is sent from the vehicle over the first two-way call via the cellular phone.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below permits an existing connection between a call center and a vehicle telematics unit (or other cellular phone at the vehicle) to be split off from a three or more-way call and connected to a data modem or other data receiver so that vehicle data can be uploaded to the call center or other remote facility without removing the call center and one or more other parties from voice communication with each other, and without subjecting any of the callers to the modem signalling used to transfer the vehicle data. When used in an emergency situation for a three-way call between the vehicle, call center, and PSAP, this approach permits continued voice communication between the call center advisor and PSAP during the vehicle data upload, thereby possibly helping the PSAP personnel to provide the quickest service possible to persons at the vehicle.

Although the illustrated embodiment discusses the use of the disclosed system and method in conjunction with a PSAP to provide emergency assistance, it will be appreciated that the system and methods discussed herein can be used in various other circumstances that involve calls of three or more parties that do not involve PSAPs and/or that do not require emergency assistance.

Communications System—

Figure 1:
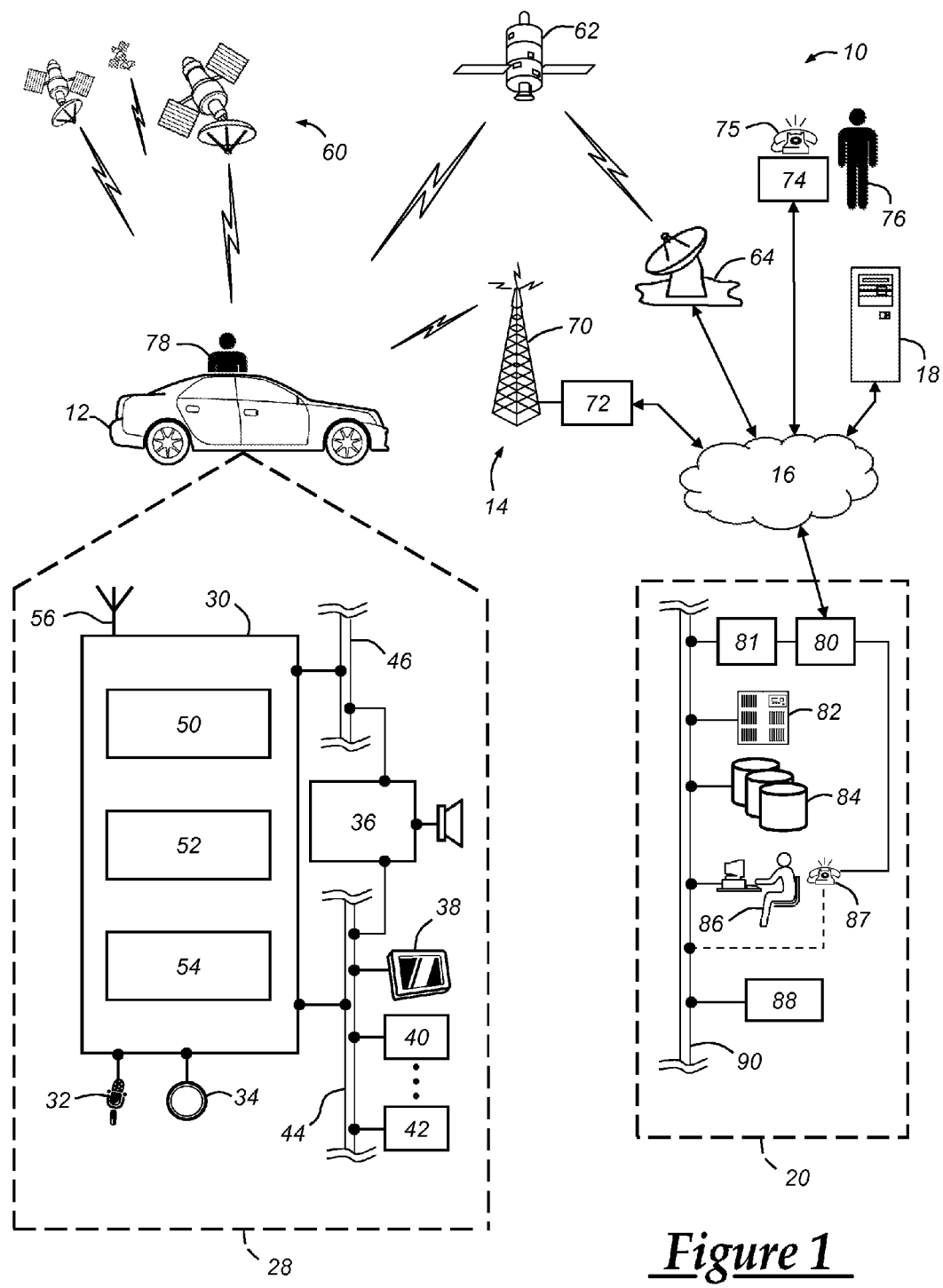
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, a call center 20, and PSAP 74. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. These components together comprise an embedded cellular phone that is capable of providing voice communication via the microphone 32 and audio system speaker, as well as data communication via the modem. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated invehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 via a telephone 87 or to the automated voice response system 88 using VoIP. The live advisor phone can also use VoIP as indicated by the broken line in FIG. 1. VoIP and other data communication through the switch 80 is implemented via a modem 81 connected between the switch 80 and network 90. Data transmissions are passed via the modem 81 to server 82 and/or database 84. Database 84 can store account information such as subscriber authentication information, vehicle identifiers, profile records, behavioral patterns, and other pertinent subscriber information. This information can be accessed by the advisor 86 via a computer terminal or otherwise. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Public safety answering point (PSAP) 74 can be a police or other emergency services dispatcher, or the like, and are well known in the art. Exemplary PSAP facilities are equipped to handle 911 and other emergency and/or non-emergency calls. The PSAP 74 will typically include one or more live persons 76 trained to assist an occupant or other person 78 located at the vehicle 12 via a telephone 75.

Method—

Figure 2:
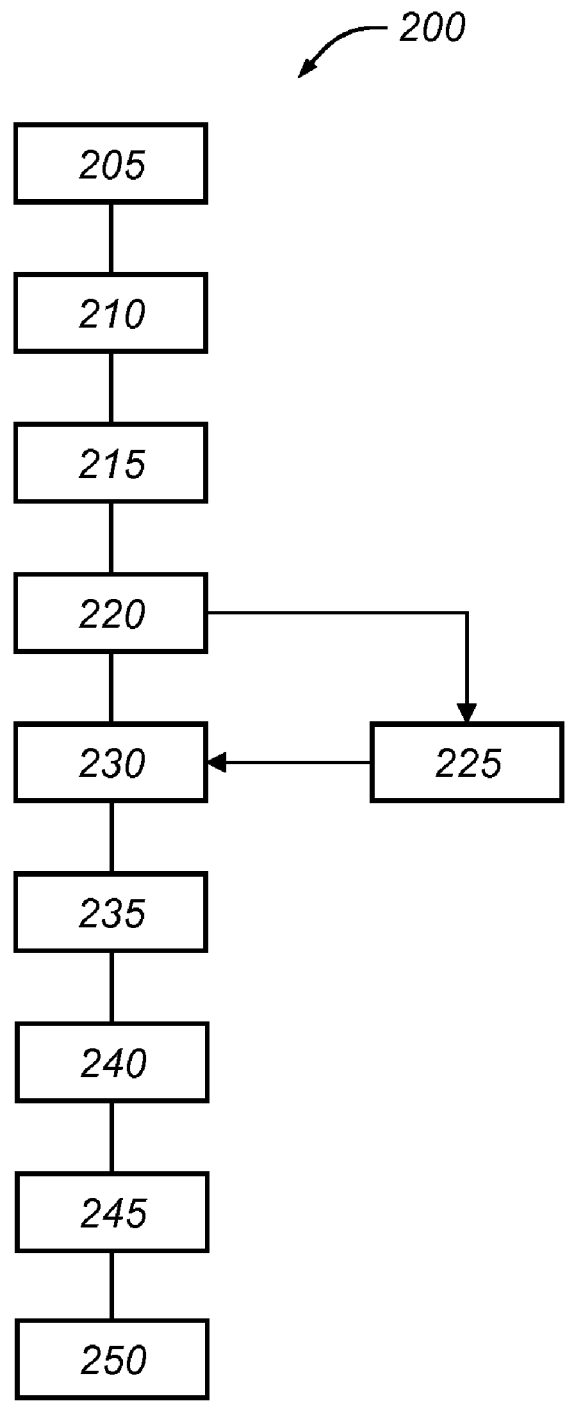
FIG. 2 is a flowchart depicting an exemplary embodiment of a method that can be carried out using the communication system of FIG. 1.
Figure 3:
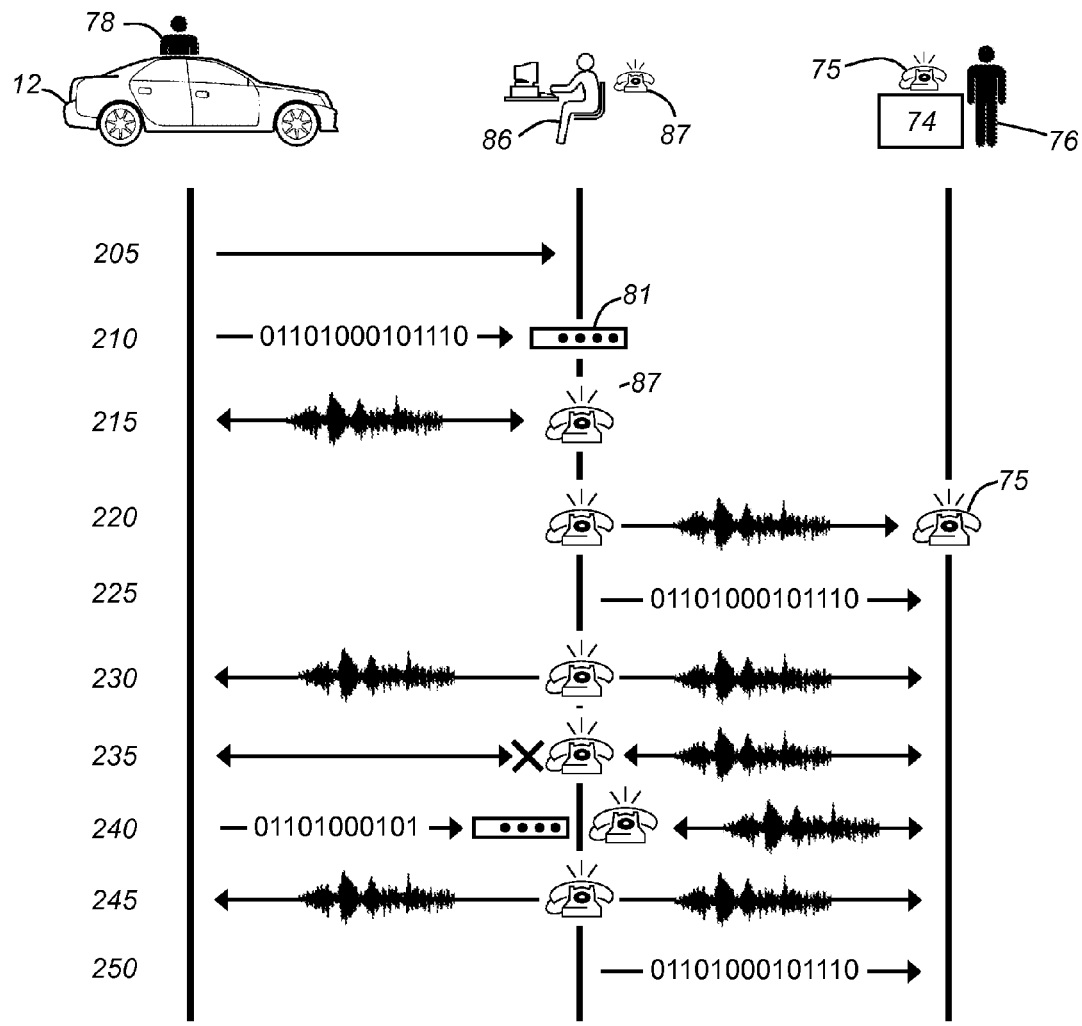
FIG. 3 is a diagram showing telephone line interconnections for voice and data communications between parts of the communication system of FIG. 1.

Turning now to FIGS. 2 and 3, there is shown a method of handling a multi-way call involving the vehicle telematics unit 30, call center 20, and PSAP 74. In general, a multi-way call involves at least two parties using two different phone terminals; however, it will be appreciated that for some of the steps of the method below, the multi-way call involves at least three parties with separate phone terminals conferenced or otherwise connected together into a single voice call. Depending on the technology, data can be transferred between two or more of the parties during the voice call, preferably in a manner that does not interfere with voice communication.

For the typical telephone voice line established between the vehicle telematics unit 30 and call center 20, data can be transferred over the established voice channel by switching from a voice mode to a data mode in which a data compatible modem is used at each end to communicate data in one or both directions, as described above. Techniques for this data transfer and for switching between voice and data modes and back again are known to those skilled in the art.

FIG. 2 depicts an exemplary method 200 as it could be used for providing emergency services to one or more persons at the vehicle, including connecting them to PSAP personnel who are best able to assess the situation and provide an emergency responder if necessary. FIG. 3 shows the various telephone call interconnections and voice and data flows for the method of FIG. 2. It will be appreciated that this method 200 is directed to an emergency assistance situation, but that the process can be adapted for other, non-emergency applications as well. Furthermore, some of the steps can be eliminated and others added as necessary or desired for a particular application.

The first step 205 in the method is the initiation of a call from the telematics unit 30 to the call center 20 over at least the wireless carrier system 14. This is done using the cellular phone embedded in the telematics unit that utilizes the cellular chipset 50 and antenna 56 for sending and receiving transmissions to and from the carrier system 14. This call can be an emergency call initiated automatically by a vehicle collision (crash) sensor, as is known in the art. Alternatively, it can be the result of a manual input from the driver or other occupant; for example, by a press of pushbutton 34 or via a voice command inputted using microphone 32 and processed by an on-board automatic speech recognition (ASR) system. In other embodiments, this initial call can be placed from the call center 20 to the telematics unit 30; for example, by an advisor in response to a request or notification received separately by the call center from the vehicle or another source.

Once this call is established, then if desired or necessary, a data mode can initially be established using the modems at each end to upload vehicle data from the telematics unit to the call center. This is shown at step 210. Data, commands, or software can also be downloaded to the vehicle. The vehicle data obtained can be any of the various data items available to the telematics unit 30, such as data received from a VSM over the communication bus 44. For example, vehicle data can include location information from GPS module 40 that provides the global position of the vehicle 12, previous and/or current data from crash sensors or other sensors concerning vehicle speed, acceleration, operating condition, airbag deployment, etc., ignition status (on/off), whether the engine is running, and various other data useful in assessing the situation or otherwise providing services to persons at the vehicle. Vehicle-specific information unique to the vehicle and/or to the telematics unit can also be sent which can be used by the call center to automatically identify the particular vehicle involved, as well as the subscriber. This initial vehicle data can be uploaded as soon as the call is established, before voice communication is made available between the call center advisor and person(s) at the vehicle, or can be done subsequently after voice communication.

At step 215, voice communication is carried out which can be used by the call center advisor to assess the need for emergency services. This may be done initially using VRS 88 as the initial advisor handling the call and, if emergency services are needed, the call can be switched to the call center phone terminal 87 for handling by a live advisor 86. Assuming emergency services are needed or requested, the advisor 86 may place a second call to the PSAP 74 which is received by its phone terminal 75 and handled by a dispatcher 76 or the like. This is shown at step 220. This second call can initially be a separate two-way call placed by the advisor from the call center terminal 87 or otherwise, which enables the advisor to have an initial private conversation with the PSAP person 76, and in which case the two, two-way calls can then be bridged or otherwise conferenced together into a single three-way call, as described below. Alternatively, the call to the PSAP can be placed with the person 78 at the vehicle 12 already on the line.

The establishment of this three-way voice call occurs at step 230. Either before or after this is done, vehicle data, such as vehicle location, can be sent to the PSAP 74 as a separate step 225 for use in providing first responder services. The three-way call interconnects the telematics unit 30, call center terminal 87, and PSAP terminal 75 into a single voice call enabling three-way voice communication between the person 78 at the vehicle with both the advisor 86 and PSAP person 76. The situation can then be assessed by the PSAP personnel with assistance from the adviser 86 and/or the person 76 at the vehicle, as well as possibly using the received vehicle data. It may be desirable or necessary during this three-way call to obtain vehicle data which, in the event step 210 is carried out, can be updated vehicle data. This can be helpful, for example, to provide current location information in the event the vehicle is moving or to obtain additional or updated information concerning the vehicle condition. To do so, the connection between the call center 20 and telematics unit 30 is switched out of the three-way call into a separate connection between the telematics unit 30 and modem 81 at the call center 20. This may be initiated by the advisor by an explicit command (request) to switch to data mode or in response to an advisor request for vehicle status or for particular vehicle data. This switching may be done without terminating or ending either the connection from the telematics unit 30 or the connection from the PSAP 74, and this can be done by means known in the art; for example, by electronically re-routing the incoming connection from the telematics unit to the modem via PBX 80, and this may involve briefly placing the telematics connection (and/or the PSAP connection) in a hold state while the switching is carried out. This switching occurs at step 235 and results in a breaking of the three-way call into two separate two-way calls—one between the vehicle 12 (telematics unit 30) and call center 20 (modem 81), and the other between the call center 20 (phone terminal 87) and the PSAP 74 (phone terminal 75). Thus, the switching out of the telematics unit connection to route it instead to the modem 81 is done while maintaining the two-way voice call between the call center and PSAP. Of course if other parties are connected in to the call (i.e., if it starts as a four or more-way call prior to switching out the telematics unit), then those parties as well may be maintained on the call as the telematics unit connection is switched out so that voice and/or data communications between the remaining parties on the line can continue.

During these two separate calls, data transmissions between the vehicle and call center can be carried out over the first two-way call; for example, to obtain vehicle data at the call center for use by the advisor or PSAP, or to provide data or commands to the vehicle (e.g., to activate hazards flashers on the vehicle). And, voice communications (and/or data communications) can be carried out between the call center and PSAP over the second two-way call. This is shown at step 240. An advantage of this splitting off the telematics unit connection to obtain data is that the PSAP dispatcher 76 does not have to wait until the data transmission is complete to continue the call with the call center advisor 86, nor does the dispatcher 76 have to be subjected to hearing the modem signaling tones used by the modems for data transfer.

Once the receipt of vehicle data by the call center is complete, the telematics unit connection may be bridged or otherwise switched back into the multi-way call (two-way, three-way or otherwise) that is ongoing between at least the call center and PSAP. This is indicated at step 245. Again, this switching can be done using telephony technology and techniques know to those skilled in the art. The switching back to a three-way call with the vehicle can be initiated by the advisor 86 or can occur automatically under computer control once it has been determined by the system that the vehicle data upload is complete.

In addition to or in lieu of this switching back to a three-way call, at least some of the vehicle data received by the call center can be passed along to the PSAP, either electronically or verbally by the advisor. This is shown at step 250 and can be useful, for example, to provide the PSAP with updated vehicle location information for help in directing police or other emergency responders. The call can then be completed or continued, with the switching out of the telematics unit to obtain data being done one or more additional times, if necessary.

While the embodiments discussed above utilize a cellular phone embedded as an integral part of the telematics unit, it will be appreciated that other telephony devices at the vehicle can be used instead to carry out the method. For example, a personal mobile device such as a cellular phone carried by a vehicle occupant that is interfaced by Bluetooth or some other short range wireless communication to the vehicle telematics unit could be used. In such an embodiment, the personal cellular phone provides wireless cellular communication with the call center and connects to the vehicle via the short range wireless connection so that vehicle data can be passed to the occupant's phone and relayed to the call center. Other such variations will become apparent to those skilled in the art.

Additional details of various aspects of some of the above-described steps can be found in commonly-owned US Patent Application Publication No. 2009/0168974, published Jul. 2, 2009. This publication discloses an exemplary system and method for obtaining initial vehicle data over a call received from the vehicle, contacting an appropriate PSAP, and establishing a three-way call between the vehicle, call center, and PSAP. Although the system discussed primarily therein utilizes a VoIP communication technology, it will be appreciated that the method described herein can be utilized with a public switched telephone network (PSTN) or other packetized or non-packetized voice communication technology. Also, commonly-owned US Patent Application Publication No. 2008/0143497, published Jun. 19, 2008 discloses a method of establishing an emergency call from a vehicle telematics unit to a call center, with vehicle data being transferred to the call center before switching to voice communication between an occupant of the vehicle and advisor at the call center. The complete disclosure of each of these published applications is hereby incorporated by reference.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although data compatible modems are described above in connection with the illustrated embodiment, it will be appreciated that any data receiver can be used for the receipt and/or transmission of data between the various parties involved. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of obtaining vehicle data during a multi-way call involving a vehicle telematics unit, call center, and at least one third party, comprising the steps of:

> conducting a multi-way voice call involving at least three different phone terminal units which include a vehicle telematics unit, a call center terminal, and a third party terminal, wherein the multi-way voice call involves a telephone connection to the telematics unit and a telephone connection to the third party terminal;
>
> separating the multi-way voice call into a two-way call and a second multi-way call, wherein the two-way call is switched from a voice transmission mode to a data transition mode when vehicle data is sent between the call center and the vehicle telematics unit while maintaining voice communications between the call center and the third party;
>
> receiving, at a data receiver, vehicle data sent from the telematics unit over the two-way call; and
>
> ending the two-way call with the data receiver and reconnecting the telematics unit to the multi-way voice call without ending the telephone connection to the telematics unit.

2. The method of claim 1, wherein the conducting step further comprises the steps of receiving at the call center terminal a first telephone call from the telematics unit, placing a second telephone call to the third party terminal, and thereafter connecting the first and second telephone calls into the multi-way voice call.

3. The method of claim 2, further comprising the step of receiving first vehicle data from the telematics unit during the first telephone call, and wherein the receiving step further comprises receiving updated vehicle data from the telematics unit during the separate call.

4. The method of claim 1, wherein the separating step further comprises the steps of receiving a request for the vehicle data from an operator of the call center terminal and, in response to the request, bridging the telematics unit telephone connection from the multi-way voice call to the data receiver.

5. The method of claim 1, wherein the data receiver is a data compatible modem and wherein the receiving step further comprises the steps of carrying out a data session between the telematics unit and modem over the two-way call call, receiving the vehicle data from the telematics unit at the modem, and then providing at least some of the vehicle data to a call center advisor who is in voice communication with one or more public safety personnel via the multi-way voice call.

6. The method of claim 1, wherein the vehicle data includes vehicle location information indicative of the current global position of the vehicle.

7. A method of obtaining vehicle data during a multi-way call involving a vehicle telematics unit, call center, and at least one third party, comprising the steps of:

> (a) receiving a telephone call at a call center placed from a cellular phone located at a vehicle having at least one occupant requiring emergency assistance;
>
> (b) conducting an initial voice conversation between an advisor at the call center and a person at the vehicle via the cellular phone;
>
> (c) establishing a three-way call by connecting a public safety answering point (PSAP) into the telephone call so as to place the person at the vehicle in voice communication with a person at the PSAP via the three-way call;
>
> (d) splitting the three-way call into a first two-way call between the cellular phone and call center and a second two-way call between the call center and the PSAP wherein the first two-way call is switched from a voice transmission mode to a data transmission mode when vehicle data is sent between the call center and the vehicle telematics unit while maintaining voice communications between the call center and the PSAP; and
>
> (e) receiving vehicle data at the call center that is sent from the vehicle over the first two-way call via the cellular phone.

8. The method of claim 7, wherein the cellular phone comprises a vehicle telematics unit.

9. The method of claim 7, wherein step (a) further comprises receiving initial vehicle data at the call center from the vehicle via the cellular phone, and wherein step (e) further comprises receiving updated vehicle data.

10. The method of claim 9, wherein the initial and updated vehicle data includes vehicle global position information.

11. The method of claim 7, wherein step (c) further comprises the steps of placing a voice call from the call center to the PSAP and connecting the telephone call from the cellular phone with the voice call to the PSAP to create the three-way call.

12. The method of claim 7, wherein further comprising the step of conducting voice communication between the advisor and the person at the PSAP over the second two-way call.

13. The method of claim 7, further comprising the step of providing the vehicle data to the advisor at the call center.

14. The method of claim 7, further comprising the step of reconnecting the first and second two-way calls into a three-way call after step (e).

\* \* \* \* \*